April 12, 1949. H. G. SCHUTZE 2,467,162
PREPARATION OF ALUMINUM HALIDE CATALYST
Filed June 6, 1947
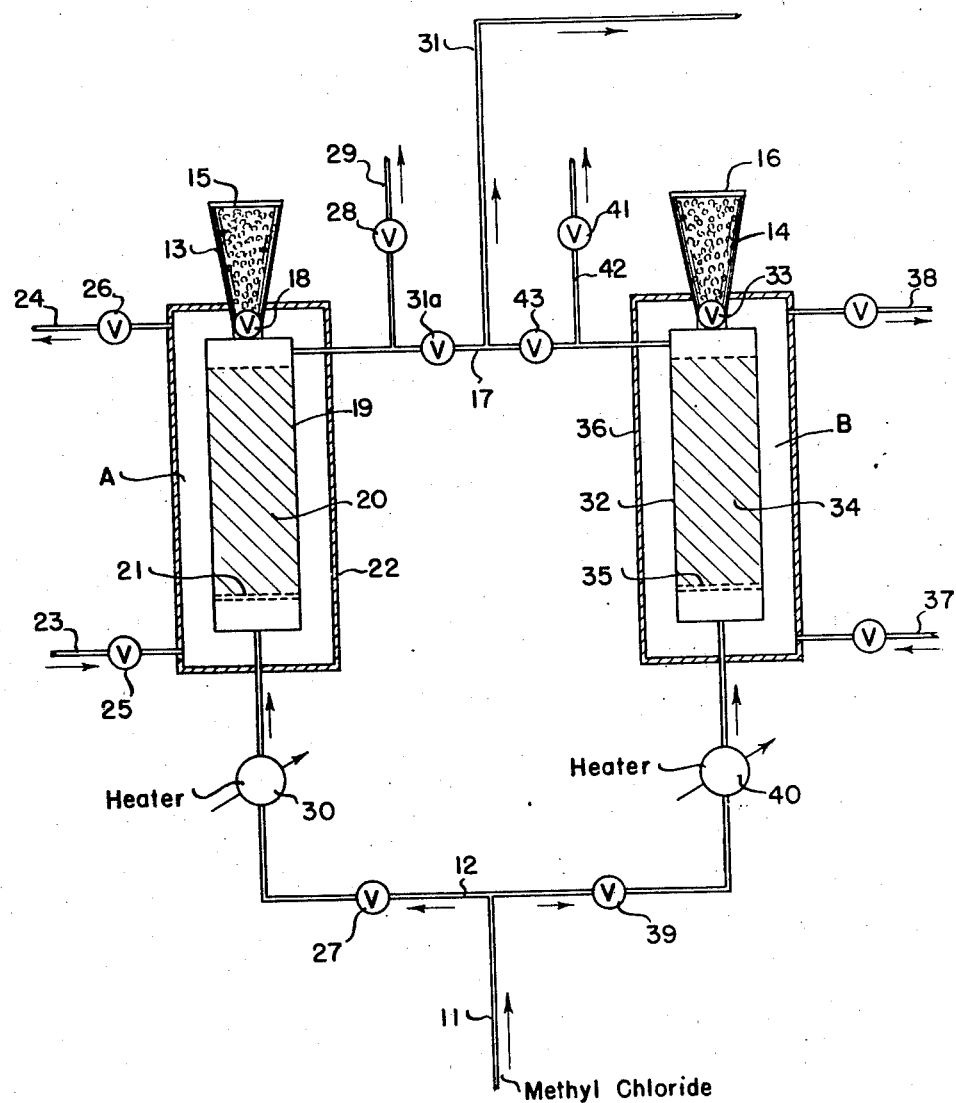
Henry G. Schutze INVENTOR.
BY
J. S. McKean
ATTORNEY.

Patented Apr. 12, 1949

2,467,162

UNITED STATES PATENT OFFICE 2,467,162

PREPARATION OF ALUMINUM HALIDE CATALYST

Henry G. Schutze, Goose Creek, Tex., assignor, by mesne assignments, to Standard Oil Development Company, Elizabeth, N. J., a corporation of Delaware Application June 6, 1947, Serial No. 752,967

12 Claims. (Cl. 252—429)

The present invention is directed to an improved catalyst and a method for preparing same. More particularly, the invention is directed to a catalyst suitable for use in the polymerization of a tertiary olefin and a diolefin and a method of preparing the catalyst.

In the polymerization of a tertiary olefin and a diolefin at low temperatures in the range of about $-50°$ F. to about $-200°$ F. in the presence of a Friedel-Crafts catalyst to produce a high molecular weight polymer having rubbery characteristics, it is customary to prepare a feed mixture including the tertiary olefin and the diolefin. The feed mixture or its components are usually chilled to a temperature in the aforementioned range prior to introduction of a solution of a catalyst, including a Friedel-Crafts catalyst, in the feed mixture. Ordinarily, it is customary to prepare a catalyst solution of aluminum chloride in methyl chloride. This catalyst has found commercial use in polymerizing mixtures of isobutylene and isoprene, for example, to high molecular weight polymers forming the synthetic rubber known to the trade as GR–I.

The production of this synthetic rubber is extremely susceptible to operating variables. For example, the temperature of the reaction must be carefully controlled at a temperature say of approximately $-140°$ F. to produce a product having the required characteristics of a synthetic rubber. Too, the feed stocks, that is the tertiary olefin and the diolefin, must be subjected to expensive purification treatment to remove poisons for the reaction. For example, water, sulfur compounds, oxygenated bodies, olefinic polymers in excessive quantities, and even excessive quantities of the halides may cause undesirable variations in the reaction. All of these difficulties contribute to the operating expense in that production of the desired polymer may be lowered by short run lengths or by producing material having undesirable properties.

It has been found that, besides all of these difficulties, there are difficulties that may be attributed to the aluminum chloride catalyst itself. For example, it has been observed in commercial operations that the preparation of catalyst solutions for the production of GR–I by polymerization of isobutylene and isoprene employing aluminum chloride in highly purified methyl chloride as solvent, it is extremely desirable that both the aluminum chloride concentrated in the catalyst solution and the resulting activity of the catalyst solution be uniform, or at least not change abruptly, in order that complete control of the polymerization reaction may be maintained at all times. In order to obtain a uniform concentration of aluminum chloride in the methyl chloride solvent when polymerizing isobutylene and isoprene at high production rates, it is desirable to prepare the catalyst solution continuously. The catalyst solution is usually prepared by passing a liquefied stream of highly purified methyl chloride through a bed of solid aluminum chloride under conditions to obtain a saturated solution of substantially uniform concentration. However, when a catalyst solution is prepared in this manner, it has been observed that both the concentration and activity of the first increments of the solution from a new bed of commercially available aluminum chloride are usually high. As the catalyst solution is prepared by passing methyl chloride through the aluminum chloride bed, both the activity and the concentration of the catalyst solution decrease with successive displacements of the vessel in which the aluminum chloride is contained until approximately 30% of the original bed has been dissolved. After the first portion of the bed has been dissolved, the catalyst solution of aluminum chloride in methyl chloride will remain relatively uniform until the bed of aluminum chloride has been depleted. It is believed that this condition is due to high concentrations of hydrogen chloride and certain hydrolysis products of aluminum chloride which are usually present in commercial grades of substantially anhydrous aluminum chloride. It is believed that these products are appreciably more soluble in methyl chloride than in aluminum chloride and are capable of increasing the activity of the catalyst solutions formed by dissolving the aluminum chloride in methyl chloride. While the free hydrogen chloride is easily removed from the aluminum chloride by washing with methyl chloride or by purging with methyl chloride vapors at substantially atmospheric temperatures, the hydrolysis reaction products appear to have a much lower volatility than the hydrogen chloride and may be removed by dissolving them in methyl chloride. This, of course, is disadvantageous if the hydrolysis products are to be removed since a substantial quantity of aluminum chloride is lost and a substantial quantity of methyl chloride is required for the washing operation.

From the foregoing discussion, it will be apparent that the preparation of an aluminum chloride catalyst solution in methyl chloride is not a simple problem.

The stability of hydrated inorganic materials is usually dependent on the temperature and pressure to which they are subjected. For example, in the case of aluminum chloride, the monohydrate hydrolyzes at −23° C. and atmospheric pressure to produce $AlCl_2OH$ and hydrogen chloride. The $AlCl_2OH$ produced by this hydrolysis is not considered to be an active catalyst for the polymerization of isobutylene and isoprene, for example, to produce GR–I when used in the pure state. However, it has been observed that this material is very soluble in methyl chloride and is active catalytically when present in admixture with aluminum chloride. The stability of the $AlCl_2OH$ is low at room temperature and at 50° C. it decomposes at a very high rate to give AlOCl and HCl. The AlOCl is very insoluble in methyl chloride and is catalytically inactive for the polymerization of isobutylene and isoprene to produce GR–I.

It is, therefore, the main object of the present invention to provide a method for preparing a catalyst which has uniform activity in the polymerization of olefins.

Another object of the present invention is to provide a method for preparing a catalyst for the production of synthetic rubber which is of substantially uniform activity.

A still further object of the present invention is to provide an improved catalyst suitable for use in the polymerization of olefins.

The foregoing objects of the present invention are achieved by preparing a catalyst from an aluminum halide which has been heated to a temperature in the range from about 150° to 300° F. and which has, subsequent to the heating operation, been contacted with vaporous or liquid methyl chloride to remove hydrolysis reaction products; the heated and washed aluminum chloride is then dissolved in an alkyl halide to form an improved catalyst.

Briefly then, the present invention may be described as involving the heat treatment of a substantially anhydrous aluminum chloride at a temperature in the range between 150° to 300° F., subjecting the heated catalyst to a washing or purging operation in which it is contacted with vaporous or liquid methyl chloride to remove hydrolysis reaction products and then forming a solution of the heated and washed aluminum chloride with liquid methyl chloride.

The invention also includes a catalyst composition comprising aluminum chloride which has been subjected to a heat treatment at a temperature in the range between 150° F. and 300° F. and washed or purged with liquid or vaporous methyl chloride and an alkyl halide such as methyl chloride.

The temperatures to which the aluminum halide is heated will ordinarily be in the range of about 150° to 300° F. However, either higher or lower temperatures may be employed. The lower temperature limit will be controlled by the decomposition temperature of the hydrates of aluminum chloride while the upper temperature limit, of course, will be controlled by the sublimation temperature of aluminum chloride which is in the neighborhood of 361° F. Therefore, it will be preferred to employ a temperature in the range of about 150° to 300° F.

The invention will be further illustrated by reference to the drawing in which the single figure represents a flow diagram of one mode of practicing the invention.

Referring now to the drawing, letters A and B desigate respectively drums in which aluminum chloride, for example, is prepared in accordance with the present invention. Drums A and B have leading into them a conduit 11 by way of manifold 12 through which methyl chloride may be introduced in a manner to be described. Drums A and B are also provided with hoppers 13 and 14, respectively, provided with hinged covers 15 and 16. Catalyst drums A and B are also interconnected by a second manifold 17 by which the effluents from the two drums are distributed.

In preparing a catalyst in accordance with the present invention, drum A, for example, is filled with aluminum chloride which is loaded into hopper 13 in the substantial absence of atmospheric or any other moisture. The cover 15 of hopper 13 is closed and hopper valve 18 is opened allowing the contents of the hopper 13 to drop into vessel 19 and form a bed of aluminum chloride indicated by the shaded portion 20 by buildup on a grid plate 21. The vessel 19 is surrounded by a jacket 22 provided with a valved inlet 23 and a valved outlet 24 by means of which a heating fluid may be circulated.

Assuming that the bed 20 has been formed and it is desired to treat it in accordance with the present invention, a heating fluid is introduced into the space defined by vessel 19 and jacket 22 by opening valve 25 in inlet 23 and valve 26 in outlet 24 and thus allowing the heating fluid to circulate around the vessel 19. The heating fluid is at a temperature in the range between 150° and 300° F. This is continued for a preferred time of about 2 to 4 hours but shorter or longer times of heating the aluminum chloride, forming bed 20, may be employed. After the period of heating has been concluded, a stream of methyl chloride may be introduced by line 11 and routed through the treated bed 20 by opening valve 27 in manifold 12 and opening valve 28 in line 29, thus allowing the methyl chloride introduced by line 11 to flow through line 11, manifold 12, bed 20, manifold 17, and out by way of line 29. This flow of methyl chloride, which may be either in a vaporous or liquid form, effectively purges the bed 20 of hydrolysis decomposition products of aluminum chloride which has been effected by the heat treatment. When the methyl chloride is employed in the vaporous state, the methyl chloride may be subjected to a heating and vaporizing operation by circulating a suitable heating fluid through heater 30 arranged in manifold 12.

After the purging operation has been concluded the catalyst bed 20 may be suitably cooled by circulating a cool fluid through the space defined by the vessel 19 and jacket 22 through inlet 23 and outlet 24. Methyl chloride in a liquid state is then introduced at substantially atmospheric temperature and allowed to flow through the bed 20 and outwardly through manifold 17 and line 31 by opening valve 31a to a catalyst storage drum which is not shown.

While the catalyst is being prepared by dissolving the aluminum chloride in methyl chloride in drum A, a load of catalyst may be deposited in the catalyst drum B by placing a charge of substantially anhydrous aluminum chloride in hopper 14 and allowing it to discharge into vessel 32 by opening hopper valve 33 to form a bed of aluminum chloride indicated by the shaded portion 34 by buildup on the grid plate 35. A heating fluid at a temperature in the range between 150° and 300° F. may then be circulated through the space defined by the vessel 32 and jacket 36 by introducing it through valved inlet 31 and allowing it to flow in and around the vessel 32 and outward through valved outlet 38. The circulation of heating fluid is continued for a preferred time in the range between 2 and 4 hours. The heating may then be discontinued and aluminum chloride bed 34 may then be suitably washed or purged by passage therethrough of a portion of the methyl chloride introduced by line 11. This is accomplished by manipulating valve 39 in manifold 12. If desired, the methyl chloride may be vaporized by circulating a heating fluid through the heater 40. The methyl chloride, on passage through the bed 34, dissolves hydrolysis decomposition products and the solution containing them leaves vessel 32 by way of manifold 17 and passes outwardly from the system by opening valve 41 in line 42. After the bed 34 has been flushed suitably with about 2 to 10 volumes of liquid methyl chloride, it is then conditioned for use in making up the improved catalyst. This may be done by closing valve 41 and opening, in this particular instance, valve 43 in manifold 17 and allowing liquid methyl chloride to flow through the bed 34.

Although the foregoing description taken with the drawing describes one mode of practicing the present invention, there are other methods by which the catalyst may be prepared. For example, aluminum chloride is readied for the market by placement in canisters or drums containing approximately 50 pounds of substantially anhydrous aluminum chloride. The aluminum chloride may be suitably heat treated by punching holes into the drums and placing the drums in a hot box or other atmosphere maintained at a temperature in the range between 150° and 300° F. After the punched drums of aluminum chloride have remained in the hot box for a time in the range of 2 to 4 hours, the drums of heated aluminum chloride may be dumped into a suitable vessel and the aluminum chloride purged of hydrolysis decomposition products by passage of a vaporous or liquid stream of methyl chloride therethrough prior to making up a solution of aluminum chloride in methyl chloride. During the dumping operation, it is important to exclude moisture from contact with the aluminum chloride.

Still another way of practicing the present invention, the aluminum chloride may be dumped into a drum equipped with heating coils and the temperature of the aluminum chloride raised to a temperature in the range mentioned, following which the heated aluminum chloride is purged or washed with vaporous or liquid methyl chloride.

The improved catalyst solution prepared in accordance with the present invention should comprise a solution of treated aluminum chloride of a concentration of about 0.1 to 0.5 gram of aluminum chloride per 100 cubic centimeters of solution. Some latitude is allowed in this respect but lower solution concentrations require relatively large quantities of solution in the polymerization reaction while higher concentrations may be too active.

The feed stock which may be polymerized with the improved catalyst will ordinarily comprise about 25% hydrocarbon and about 75% by volume of diluent, for example methyl chloride. The hydrocarbon component may comprise a tertiary olefin and a diolefin such as isobutylene to which has been added 2 to 20% by volume of isoprene. A hydrocarbon feed mixture containing 2.5% isoprene based on the isobutylene may be polymerized with the improved catalyst to a useful high molecular weight synthetic rubber.

While the invention has been described and illustrated by reference to aluminum chloride, it will be understood that the invention is not limited to aluminum chloride per se. Other aluminum halides, for example, aluminum bromide, may be suitably treated and employed to form the catalyst of the present invention. Similarly, methyl chloride is not the only alkyl halide which may be employed. It may be desirable to use ethyl chloride or other halides of the same homologous series, or other solvents such as carbon disulfide, carbon tetrachloride, and the like. Any organic solvent unreactive with aluminum chloride and which will not form stable complexes with it and which has a low boiling point may be employed as the washing or purging medium and as a medium for making up the solution.

It may be desirable to use one solvent as the washing or purging medium and still another as the medium for making up the solution.

The nature and objects of the present invention having been completely described and illustrated, what I wish to claim as new and useful and to secure by Letters Patent is:

1. A method for preparing a catalyst which includes the steps of heating substantially anhydrous aluminum halide to a temperature in the range between 150° and 300° F. for a time sufficient to decompose hydrates of aluminum halides, contacting the heated aluminum halide with an alkyl halide to remove hydrolysis decomposition products, and subsequently dissolving the aluminum halide in an alkyl halide.

2. A method in accordance with claim 1 in which the aluminum halide is aluminum chloride and the alkyl halide is methyl chloride.

3. A method in accordance with claim 1 in which the aluminum halide is heated for a time in the range between 2 and 4 hours.

4. A method for preparing a catalyst which includes the steps of heating substantially anhydrous aluminum halide to a temperature in the range between 150° and 300° F. for a time sufficient to decompose hydrates of aluminum halide, contacting the heated aluminum halide with a vaporous alkyl halide to remove hydrolysis reaction products and dissolving the contacted aluminum halide in a liquid alkyl halide.

5. A method in accordance with claim 4 in which the vaporized alkyl halide and the liquid alkyl halide is methyl chloride.

6. A method in accordance with claim 4 in which the aluminum halide is aluminum chloride and the alkyl halide is methyl chloride.

7. A method in accordance with claim 4 in which the aluminum halide is heated for a time in the range between 2 and 4 hours.

8. A method for preparing an improved catalyst which includes the steps of heating substantially anhydrous aluminum chloride to a temperature of approximately 195° F. for approximately 3 hours, washing the heated aluminum chloride with 2 to 10 volumes of liquid methyl chloride and then dissolving the washed aluminum chloride in liquid methyl chloride.

9. A method for preparing an improved catalyst which includes the steps of heating substantially anhydrous aluminum chloride to a temperature of approximately 195° F. for about 3 hours, purging the heated aluminum chloride with a stream of vaporized methyl chloride to free it of hydrolysis reaction products and then dissolving the purged aluminum chloride in liquid methyl chloride.

10. A method for preparing a catalyst which includes the steps of heating substantially anhydrous aluminum halide to a temperature within the range between 150° and 300° F. for a time sufficient to decompose hydrates of aluminum halides, contacting the heated aluminum halide with a solvent unreactive with aluminum halide and which will not form stable complexes with aluminum halide to remove hydrolysis decomposition products and subsequently dissolving the aluminum halide in said solvent.

11. A method in accordance with claim 10 in which the aluminum halide is aluminum chloride and the solvent is methyl chloride.

12. A method in accordance with claim 10 in which the aluminum halide is heated for a time in the range between 2 and 4 hours.

HENRY G. SCHUTZE.

REFERENCES CITED

The following references are of record in the file of this patent:

UNITED STATES PATENTS

| Number | Name | Date |
| --- | --- | --- |
| 2,276,893 | Thomas et al. | Mar. 17, 1942 |
| 2,383,627 | Thomas et al. | Aug. 28, 1945 |
| 2,418,346 | Gruenke | Apr. 1, 1947 |